United States Patent Office 3,398,078
Patented Aug. 20, 1968

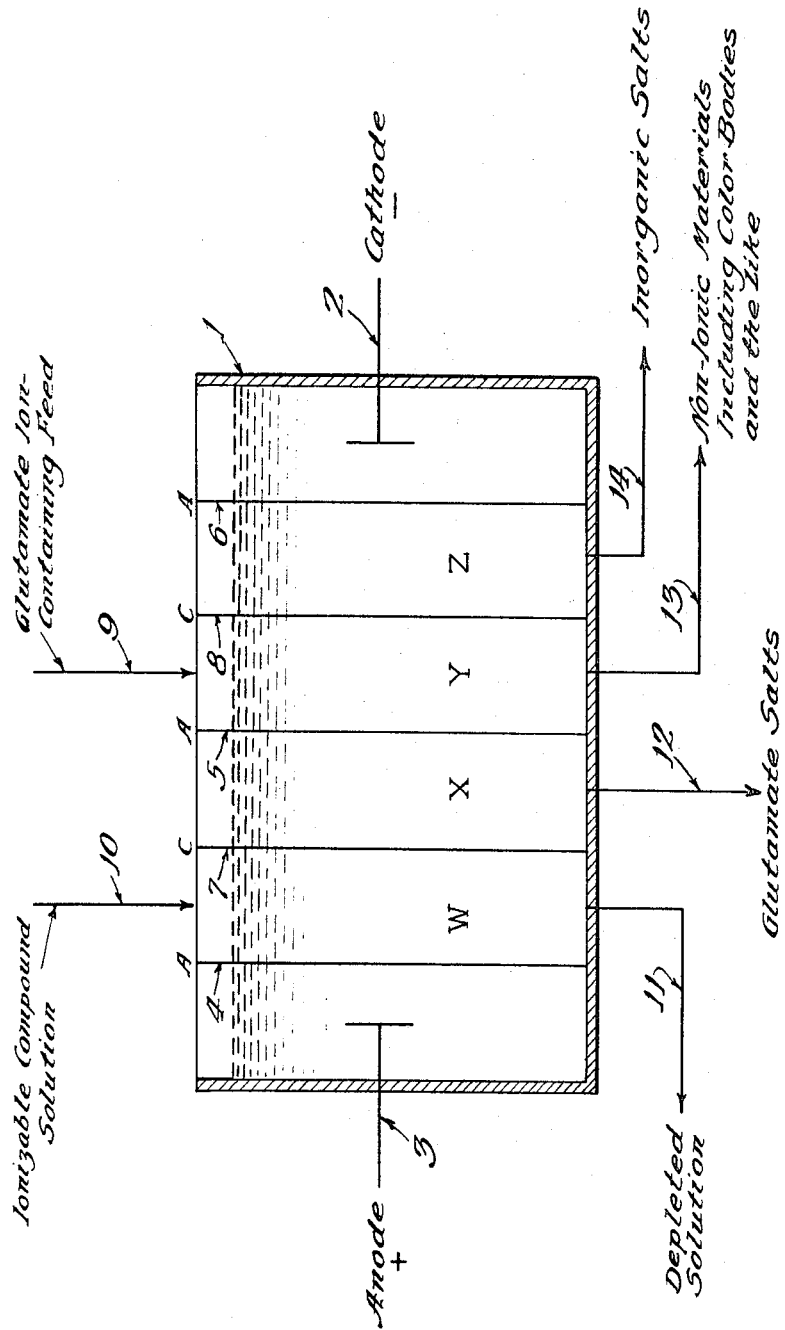

3,398,078
RECOVERY OF GLUTAMIC ACID VALUES
BY ELECTRODIALYSIS
Harry P. Gregor, Leonia, N.J., assignor to International
Minerals & Chemical Corporation, a corporation of
New York
Filed Mar. 17, 1965, Ser. No. 440,371
19 Claims. (Cl. 204—180)

This invention relates to a process for the recovery of glutamic acid and more particularly relates to an electrodialytic process for the recovery of glutamate ions from glutamic acid-containing solutions. It will be understood that the term "glutamic acid" as herein employed is intended to be generic to glutamic acid and its salts.

L-glutamic acid has been produced for a number of years by recovery from Steffens filtrate, wheat gluten and the like. In these processes the starting materials are hydrolyzed either with acid or with caustic to convert glutamic acid precursors to glutamic acid. The final glutamic acid-containing solutions contain impurities, such as color bodies, inorganic salts and the like. The salts are formed not only from the reagents, but also from the minerals that are present in the starting material.

More recently, L-glutamic acid has been produced by biological means. Fermentation procedures for the production of broths containing L-glutamic acid have now been reported extensively in the literature and include, inter alia, Canadian Patent 604,712 (*Micrococcus glutamicus*); Canadian Patent 625,387 (*Brevibacterium divaricatum*); Canadian Patent 633,170 (*Microbacterium flavum*); Belgium Patent 609,701 (*Corynebacterium lilium*); U.S. Patent 3,032,474 (*Bacillus magaterium-cereus*), and the like.

Once again the L-glutamic acid-containing solutions include impurities such as inorganic salts which are added to aid the fermentation and color bodies. The recovery of glutamic acid may be accomplished by adjusting the pH of the solution to the isoelectric point (about pH 3.2) of glutamic acid, utilizing a mineral acid such as hydrochloric acid, sulfuric acid and the like. At the isoelectric point the solubility of glutamic acid is quite low and consequently the glutamic acid precipitates from the solution. Such processes have been used for a number of years.

The use of ion exchange resins has also been suggested for the recovery of glutamic acid-containing solutions. Such suggestions are indicative of the efforts of the art to achieve improved methods for the recovery of glutamic acid from glutamic acid-containing solutions.

It is a primary object of the invention to provide an effective means for the recovery of glutamic acid from glutamic acid-containing solutions.

It is a further object of this invention to provide an electrodialytic method for the recovery of glutamic acid from the glutamic acid-containing solutions.

It is a still further object of the invention to provide an electrodialytic method for the recovery of glutamic acid from glutamic acid-containing solutions that substantially minimizes deleterious effects of color bodies in the initial solutions.

In accordance with the invention there is provided a process for the electrodialytic treatment of glutamic acid-containing solutions in an electrodialytic cell having alternate anion- and cation-permeable membranes which comprises:

(1) positioning a glutamic ion-containing aqueous solution in a compartment Y between two compartments X and Z containing water, said first water compartment X being positioned on the anode side of compartment Y and being separated from compartment Y by an anion-permeable membrane, said second water compartment Z being position on the cathode side of compartment Y and being separated from compartment Y by a cation-permeable membrane; and (2) positioning an aqueous solution of an ionizable compound containing cations selected from the group consisting of ammonium and metal cations in a compartment W adjacent to compartment X and on the anode side of compartment X, said compartment W being separated from compartment X by a cation-permeable membrane; and (3) passing electric current through said fluids in said compartments whereby cations from compartment W and anions from compartment Y migrate into compartment X to form a salt solution; and (4) recovering a glutamic salt from compartment X.

The method of this invention utilizes an electrodialytic cell arrangement in which between anode and cathode compartments the alternating anion- and cation-permeable membranes divide the total arrangement into one or more of the above-described W-X-Y-Z compartment combinations. The non-ionic materials, including color bodies and the like, remain in the compartment to which the feed is added while the glutamate ions pass through an anion-permeable membrane and are recovered as glutamic acid salts substantially free of non-ionic impurities. The glutamic acid salt product stream is also substantially free of inorganic cations present in the feed material. The final solution may be sufficiently pure to permit direct crystallization in a substantial amount.

The method of this invention is generically applicable to glutamic acid-containing solutions, including glutamate ion-containing aqueous solutions such as Steffens filtrate and final whole media obtained in the preparation of glutamic acid by fermentation techniques. In accordance with the preferred embodiments of the present method, the glutamic acid-containing feed solutions are subjected to a preliminary treatment such as by filtering, centrifuging and the like to remove at least the substantial majority of insoluble materials present. In the case of glutamic acid-containing solutions derived from beet molasses or wheat gluten the solutions often will contain non-ionic color bodies, ionic color bodies, various amounts of amino acids other than glutamic acid and inorganic salts such as the chlorides or sulfates of sodium, potassium, calcium and the like. In the case of glutamic acid-containing liquors derived by fermentation the solutions often will contain non-ionic and ionic impurities, e.g. color bodies, and inorganic salts such as the chloride, sulfate, phosphate and the like salts of ammonium, calcium, sodium, potassium, magnesium and the like. Such solutions can also be expected to contain small amounts of salts of "minor elements" such as manganese, iron, zinc, cobalt and the like. The production of the above-described glutamic acid-containing solutions is within the skill of the art and will not be described in detail.

The present invention can more readily be described by reference to the figure, representing a schematic drawing of an appropriate electrodialytic cell.

The electrodialytic cell 1 is equipped with a cathode 2 and an anode 3. Interposed between the anode compartment and the cathode compartment are at least four compartments W, X, Y and Z. For purposes of simplicity the cell 1 is shown having only four intermediate compartments. As described above, cells contemplated for use in the practice of this invention will have a multiplicity of such four-compartment units. Thus, the cell could contain four, eight, twelve, etc., intermediate compartments with the sequence W-X-Y-Z obtaining for each of the four-compartment units. The cell 1 is equipped with alternative anion-permeable membranes 4, 5, 6 and cation-permeable membranes 7, 8. Inlet means 9 and 10 are provided for compartments Y and W, respectively, and outlet means 11, 12, 13 and 14 are provided for compartments W, X, Y and Z, respectively.

In the operation of the cell, compartments X and Z are filled with water containing sufficient ions to sustain passage of the current. Such compartments may contain minor amounts of ionizable compounds, usually bases or basic or neutral salts, such as the chlorides, bromides, phosphates, sulfates, nitrates, or hydroxides of ammonium, sodium, potassium, calcium, magnesium, strontium, and the like. Aqueous solutions of alkali metal salts are preferred for use in compartments X and Z. Generally, molar concentrations of at least about 0.01 will suffice to carry the current.

Similarly, the anode and cathode compartments will contain aqueous solutions of one or more ionizable compounds. Once again, the ionizable compounds may be present as chlorides, bromides, phosphates, sulfates, nitrates or hydroxides of ammonium, sodium, potassium, calcium, etc. In the case of the anode and cathode compartments it is preferred that the ionizable compounds, preferably alkali metal salts, be present in an amount sufficient to provide a 0.01–1.0 molar solution.

An aqueous solution of an ionizable compound or compounds is supplied through inlet 10 to compartment W of the cell. This ionizable compound solution contains cations of water-soluble compounds such as the water-soluble hydroxides, chlorides, sulfates, nitrates, phosphates, and the like of ammonium, alkali metals, e.g. lithium, sodium, and potassium, alkaline earth metals, e.g. calcium, barium, magnesium, and strontium, and other metals, such as iron, copper, cobalt, nickel and aluminum. The alkali metal salt aqueous solutions are particularly preferred for use in compartment W. The amount of ionizable compound in compartment W preferably is sufficient to provide at least a stoichiometric equivalent of cations for the anions that are transported from compartment Y across membrane 5 between compartments X and Y in the cell. It will be apparent that compartment W can be provided with a rather concentrated initial ionizable compound solution or, alternatively, make-up quantities of solution can be added during the operation of the cell.

In the operation of the cell a glutamate ion-containing aqueous solution is introduced into compartment Y through inlet means 9. In a typical case such glutamate ion-containing solution may also contain inorganic cations such as ammonium, sodium, potassium, calcium, zinc and the like, inorganic anions such as sulfates, carbonates, phosphates and the like, and other ionic and non-ionic impurities, such as color bodies and the like.

As current is passed through the cell the anions in the glutamate ion-containing feed solution will pass through anion-permeable membrane 5 into compartment X. At the same time, cations from the ionizable compound solution in compartment W will migrate through cation-permeable membrane 7 into compartment X to provide a product salt solution which can be removed through outlet means 12. Since glutamic acid more commonly finds commercial utility as monosodium glutamate and monopotassium glutamate, the salt solution in compartment W preferably contains ionizable salts of sodium or potassium, more preferably the halide salts.

The cations in the glutamate ion-containing feed will migrate through the cation-permeable membrane 8 into compartment Z. At the same time, anions from the cathode compartment will migrate through anion-permeable membrane 6 into compartment Z to provide a solution of inorganic salts which may be removed through outlet means 14. After the feed to compartment Y has been substantially depleted of its anion and cation components the resultant solution, which remains therein and which contains the bulk of the non-ionic function of the impure glutamate ion-containing feed, is removed through outlet means 13.

The glutamate salt product solution removed through outlet means 12 will be substantially free of the cationic contaminates present in the initial glutamate ion-containing feed. Similarly, the glutamate salt product solution will be substantially free of the non-ionic contaminates present in the starting feed. It should be noted that the process contemplated by the present invention does not require the use of an adsorbent to achieve preliminarily the removal of troublesome non-ionic material, such as colloidal color bodies, from the system. If desired, however, the feed can be contacted by an adsorbent, such as granular carbon, adsorbent resins and the like, to remove a substantial amount of such non-ionic materials.

The glutamic acid values present in the glutamate salt product solution can be recovered employing methods within the skill of the art. The solution, for example, can be partially concentrated, under vacuum if desired, to cause a precipitation of at least a substantial amount of glutamic acid values present. The mother liquor can then be adjusted to a pH of from about 2.5 to about 3.5 and preferably to about 3.2 and the remaining glutamic acid values precipitated.

In one preferred embodiment of this invention a second electrodalytic cell is employed in the process. Either the starting glutamate ion-containing feed or the glutamate salt product solution may be passed through a compartment in a cell having an anion-permeable membrane on the anode side and a cation-permeable membrane on the cathode side. Since the inorganic cations and anions present tend to be more mobile than the glutamate anion, such processing may be employed to remove a substantial portion of the inorganic ionic contaminates. It is preferred to apply such second electrodialytic treatment to the glutamate salt product solution from outlet 12 of the principal electrodialytic cell. This treatment best insures the removal of the greatest amount of inorganic ionic contaminates. In either event, the use of a second cell, for what might be described as a "desalting" treatment, provides a purer final glutamate salt solution and consequently enhances the recovery of glutamic acid values from such solution.

In another preferred embodiment of the invention the processing, as described earlier, is carried on for an initial period during which the more mobile inorganic ions tend to pass across the anion and cation membranes of the cell.

At the end of such initial period the resultant solution obtained in compartment X is discarded, replaced with a fresh solution of ionizable compound and the operation of the cell is continued. Such initial period will vary widely depending upon the composition of the feed, the membrane employed, current densities and the like. Generally, such initial period will be that necessary for the passage of from about ¼ to about ½ of the total Faradays required for the complete removal of inorganic anions. This procedure is effective to remove a substantial amount of the inorganic anionic constituents of the feed that otherwise might migrate into the glutamate salt product solution of compartment X.

The cation- and anion-permeable membranes employed in the practice of the invention belong to classes of commercially available materials which are well-known to the art. These membranes are permeable essentially only to either cations or anions, and since they act substantially only as a barrier, the membranes do not require actual ion-exchange regeneration and may have a useful life of several years. Cation-permeable membranes are generally plastic films formed of such materials as polyethylene impregnated with styrene-divinyl benzene copolymers and the like, which contain a high concentration of fixed anionic groups, generally sulfonic acid groups. Anion-permeable membranes also generally are plastic films formed of basically similar materials which contain, instead of anionic groups, high concentrations of fixed cationic groups, such as, for example, quaternary ammonium groups. Permeable membranes are discussed in detail, inter alia, in Farrell and Smith, Industrial and Engineering Chemistry, vol. 54, No. 6, 29 (June 1962), Belgian Patent 568,268, British Patent 862,229 and U.S. Patent No. 3,004,909.

The spacing of the membranes within the cell of the practice of this invention is within the skill of the art. Such spacings once again will vary depending upon the feed being treated, the electric potential, and similar factors. Generally, however, the spacings between the membranes will vary from about 0.02 to about 0.125 inch, although the membranes may be spaced more closely or farther apart than indicated by this range.

The cell current densities employed for the practice of this invention are also within the skill of the art. Generally, however, current densities will range from about 2 to 60 amperes per square foot.

Since electrodialytic treatment may cause a slight amount of undesirable heating, the cell and/or the feed stream, in appropriate instances, may be cooled to prevent undesirable heating effects. Similarly, the solutions in one or more compartments in the cell may be agitated to insure efficient operation of the cell.

From the above description it will be apparent that the process of this invention can be conducted on either a batch or a continuous basis.

The following example is included in order to more fully describe the practice of the invention. The example is included for illustrative purposes only and is not intended to limit the scope of the invention.

EXAMPLE

An electrodialytic cell similar to that shown in the figure was employed with the exception that the cell arrangement contained two 4-compartment combinations in the sequence of $W-X-Y-Z-W_1-X_1-Y_1-Z_1$ between cathode 2 and anode 3. The alternating anion- and cation-permeable membranes were films of "AMFion A–110" and "AMFion C–110" (American Machine and Foundry) which contain fixed quaternary ammonium and sulfonic acid groups, respectively. In the compartments formed of the membranes, the membranes had an effective transport area of about 0.14 sq. ft. per membrane. Perforated sheets of expanded polyvinyl chloride were positioned between each of the membranes to provide spacings between membranes of the compartments of about 0.045 in. Each compartment was connected to an external fluid holding tank and means were provided for circulating fluid through each compartment at a flow rate of about 10 cc. per second.

A glutamic acid-production fermentation liquor containing about 0.35 M ammonium glutamate was filtered to remove the glutamic acid-producing microorganisms and substantially all of the remainder of the other water-insoluble impurities and then treated with activated carbon to effect the removal of a portion of the remaining color body impurities. The solution, on a dry basis, contained about 19% by weight inorganic salts and had a salt-free purity, calculated as monosodium glutamate monohydrate, dry basis, of about 91%. About 4 liters of the resultant glutamate ion-containing solution at a pH of about 5 were charged to holding tanks connected for circulation of the solution through each of compartments Y and $Y_1$. The holding tanks for the circulation systems of the remainder of the intermediate compartments were charged with aqueous sodium chloride solutions as follows:

For compartments W and $W_1$, about 4 liters of 1.0 M, for compartments X and $X_1$, about 1 liter of 0.1 M, and for compartments Z and $Z_1$, about 4 liters of 0.1 M. Holding tanks in the circulation systems connected to each of the anode and cathode compartments were charged with about 2 liters of 1.0 M sodium sulfate. With fluid circulation in the compartments being carried out as described above, current was passed through the cell arrangement for about 2 hours at about 5.6 amperes.

At the end of this time period the circulation systems of compartments X and $X_1$ were then completely emptied of solution and then the systems of X and $X_1$ were recharged with about 0.6 liter of about 0.006 M monosodium glutamate aqueous solution. Thereafter current was passed through the resulting cell arrangement for about 11.8 hours at about 2.8 amperes.

Solutions were recovered from compartments X and $X_1$ which contained only trace amounts of ammonium ions. The product streams, on a dry basis, contained about 8.9% by weight inorganic salts and had a salt-free purity, calculated as monosodium glutamate monohydrate, dry basis, of about 98.3%. The amount of glutamate salts recovered from the solutions of chambers X and $X_1$ represented about an 89% recovery of glutamic acid values from the cell feed solutions.

While this invention has been described and exemplified in terms of its preferred modifications, those skilled in the art can appreciate that variations can be made without departing from the spirit and scope of the invention.

The embodiments of the invention in which an exclusive property or privilege is claimed are defined as follows:

1. A process for the electrodialytic treatment of glutamic acid-containing solutions in an electrodialytic cell arrangement having alternate anion- and cation-permeable membranes which comprises:
   (1) positioning a glutamate ion-containing aqueous solution in a compartment (Y) between two compartments (X) and (Z) containing water, said first water compartment (X) being positioned on the anode side of compartment (Y) and being separated from compartment (Y) by an anion-permeable membrane, said second water compartment (Z) being positioned on the cathode side of compartment (Y) and being separated from compartment (Y) by a cation-permeable membrane; and
   (2) positioning an aqueous solution of an ionizable compound containing cations selected from the group consisting of ammonium and metal cations in a compartment (W) adjacent to compartment (X) and on the anode side of compartment (X), said compartment (W) being separated from compartment (X) by a cation-permeable membrane, and separated from the anode compartment by an anion membrane; and
   (3) passing electric current through the fluids in said compartments whereby cations from compartment (W) and anions from compartment (Y) migrate into compartment (X) to form a salt solution; and
   (4) recovering a glutamate salt from compartment (X).

2. The process according to claim 1 wherein said glutamate ion-containing solution is derived from a glutamic acid-production fermentation medium.

3. The process according to claim 1 wherein said glutamate ion-containing solution is a hydrolyzed Steffens filtrate.

4. The process according to claim 1 wherein said glutamate ion-containing solution preliminary to being positioned in compartment (Y) is treated to remove water-insoluble matter.

5. The process according to claim 4 wherein said glutamate ion-containing solution is derived from a glutamic acid-production fermentation medium.

6. The process according to claim 1 wherein said solution in compartment (W) is an aqueous solution of an ionizable compound containing alkali metal cations and said glutamate salt recovered from compartment (X) contains a monoalkali metal glutamate.

7. The process according to claim 6 wherein said alkali metal ionizable compound in said solution in compartment (W) is an alkali metal halide.

8. The process according to claim 1 wherein said aqueous solution in compartment (W) contains at least a stoichiometric equivalent of cations for anions which migrate from compartment (Y) into compartment (X).

9. The process according to claim 1 wherein a current density is employed in the range of from about 2 to about 60 amperes per sq. ft. and the spacing between adjacent membranes in said cell arrangement is in the range of from about 0.02 to about 0.125 inch.

10. The process according to claim 1 wherein preliminary to the positioning of said glutamate ion-containing solution in compartment (Y), said glutamate ion-containing solution is subjected to an initial electrodialytic treatment in a separate cell compartment having, on the anode side of said separate cell compartment, an anion-permeable membrane and, on the cathode side of said separate cell compartment, a cation-permeable membrane to effect the removal therefrom of at least a portion of inorganic anions and cations.

11. The process according to claim 1 wherein in said recovery of said glutamate salt from compartment (X), glutamate salt-containing solution is removed from compartment (X) and subjected to an electrodialytic treatment in a separate cell compartment having, on the anode side of said separate cell compartment, an anion-permeable membrane and, on the cathode side of said separate cell compartment, a cation-permeable membrane to effect the removal therefrom of at least a portion of inorganic anions and cations.

12. The process according to claim 1 wherein preliminary to said recovery of said glutamate salt from compartment (X) and after an initial period of current passage through the compartments of said cell arrangement, the fluid then present in compartment (X) is removed therefrom, fresh aqueous solution is added to compartment (X), and current again is passed through the compartments of said cell arrangement.

13. The process according to claim 12 wherein said initial period of current passage is that necessary for the passage through said cell arrangement of from about ¼ to about ½ of the total Faradays required for the complete removal by migration from compartment (Y) into compartment (X) of inorganic acid anions initially present in said glutamate ion-containing solution positioned in compartment (Y).

14. The process according to claim 13 wherein said glutamate ion-containing solution preliminary to being positioned in compartment (Y) is treated to remove water-insoluble matter.

15. The process according to claim 14 wherein said glutamate ion-containing solution is derived from a glutamic acid-production fermentation medium.

16. The process according to claim 13 wherein said solution in compartment (W) is an aqueous solution of an ionizable compound containing alkali metal cations and said glutamate salt recovered from compartment (X) contains a monoalkali metal glutamate.

17. The process according to claim 16 wherein said alkali metal ionizable compound in said solution in compartment (W) is an alkali metal halide.

18. The process according to claim 13 wherein said aqueous solution in compartment (W) contains at least a stoichiometric equivalent of cations for anions which migrate from compartment (Y) into compartment (X).

19. The process according to claim 13 wherein a current density is employed in the range of from about 2 to about 60 amperes per sq. ft. and the spacing between adjacent membranes in said cell arrangement is in the range of from about 0.02 to about 0.125 inch.

References Cited
UNITED STATES PATENTS

| | | | |
|---|---|---|---|
| 3,231,485 | 1/1966 | Kuwata et al. | 204—180 |
| 3,330,749 | 7/1967 | Kuwata et al. | 204—180 |

JOHN H. MACK, *Primary Examiner.*

A. C. PRESCOTT, *Assistant Examiner.*